(12) United States Patent
Stoner et al.

(10) Patent No.: US 9,258,336 B2
(45) Date of Patent: *Feb. 9, 2016

(54) DYNAMIC MODIFICATION OF A SUBSCRIBER CONNECTION

(71) Applicant: Ericsson AB, Stockholm (SE)

(72) Inventors: Thomas M. Stoner, Raleigh, NC (US); Peter Arberg, Hojbjerg (DK); Manprit Bal, San Jose, CA (US)

(73) Assignee: ERICSSON AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,948

(22) Filed: May 27, 2014

(65) Prior Publication Data

US 2014/0280993 A1  Sep. 18, 2014

Related U.S. Application Data

(63) Continuation of application No. 13/597,189, filed on Aug. 28, 2012, now Pat. No. 8,738,747, which is a continuation of application No. 13/162,554, filed on Jun. 16, 2011, now Pat. No. 8,255,561, which is a (Continued)

(51) Int. Cl.
*H04L 29/06* (2006.01)
*H04L 12/24* (2006.01)
(Continued)

(52) U.S. Cl.
CPC .......... *H04L 65/1086* (2013.01); *G06F 15/177* (2013.01); *H04L 29/06* (2013.01);
(Continued)

(58) Field of Classification Search
CPC ....................................................... H04L 67/24

USPC ........................................... 709/225, 226, 228
See application file for complete search history.

(56) References Cited

U.S. PATENT DOCUMENTS

| 4,996,685 A | 2/1991 | Farese et al. |
|---|---|---|
| 5,125,081 A | 6/1992 | Chiba |

(Continued)

FOREIGN PATENT DOCUMENTS

| EP | 0881854 A2 | 12/1998 |
|---|---|---|
| JP | 8079247 | 3/1996 |

(Continued)

OTHER PUBLICATIONS

International Search Report, Application No. PCT/US03/12863, dated Aug. 1, 2003, 5 pages.

(Continued)

*Primary Examiner* — Adnan Mirza
(74) *Attorney, Agent, or Firm* — Nicholson De Vos Webster & Elliott LLP

(57) ABSTRACT

A database server stores in a subscriber record one or more attributes of an active subscriber connection coupling a computing device associated with the subscriber, including a data rate attribute. The database server receives a request to modify one or more of the attributes of the active subscriber connection including at least to modify the data rate attribute. The database server modifies the at least one of the attributes including modifying at least the data rate attribute and transmits the at least one modified attribute including at least the modified data rate attribute for the active subscriber connection to the network element to cause the network element to modify a corresponding attribute without disconnecting the subscriber connection from the network element.

21 Claims, 6 Drawing Sheets

Related U.S. Application Data continuation of application No. 11/980,831, filed on Oct. 30, 2007, now Pat. No. 7,987,276, which is a continuation of application No. 10/176,222, filed on Jun. 20, 2002, now Pat. No. 7,290,054.

(60) Provisional application No. 60/375,684, filed on Apr. 26, 2002.

(51) Int. Cl.
*H04L 12/813* (2013.01)
*G06F 15/177* (2006.01)
*H04L 29/08* (2006.01)

(52) U.S. Cl.
CPC ............. *H04L 41/082* (2013.01); *H04L 47/20* (2013.01); *H04L 67/14* (2013.01); *H04L 69/24* (2013.01); *H04L 69/329* (2013.01)

(56) References Cited

U.S. PATENT DOCUMENTS

| | | | |
|---|---|---|---|
| 5,724,659 | A | 3/1998 | Daniel et al. |
| 5,862,325 | A | 1/1999 | Reed et al. |
| 5,983,090 | A | 11/1999 | Aoki |
| 6,105,063 | A | 8/2000 | Hayes, Jr. |
| 6,286,038 | B1 | 9/2001 | Reichmeyer et al. |
| 6,317,830 | B1 | 11/2001 | Stolz |
| 6,326,973 | B1 | 12/2001 | Behrbaum et al. |
| 6,359,890 | B1 | 3/2002 | Shoho et al. |
| 6,370,122 | B1 | 4/2002 | Nussbaumer et al. |
| 6,378,021 | B1 | 4/2002 | Okazawa et al. |
| 6,459,682 | B1 | 10/2002 | Ellesson et al. |
| 6,549,518 | B1 | 4/2003 | Sugawara et al. |
| 6,665,264 | B1 | 12/2003 | Davison et al. |
| 6,781,972 | B1 | 8/2004 | Anderlind et al. |
| 6,839,766 | B1 | 1/2005 | Parnafes et al. |
| 6,996,685 | B2 | 2/2006 | Kuzmenka |
| 7,698,432 | B2 | 4/2010 | Short et al. |
| 2001/0019559 | A1 | 9/2001 | Handler et al. |
| 2001/0036164 | A1 | 11/2001 | Kakemizu et al. |
| 2001/0053694 | A1 | 12/2001 | Igarashi et al. |

FOREIGN PATENT DOCUMENTS

| | | |
|---|---|---|
| JP | 10-117237 | 5/1998 |
| JP | 11-191772 | 7/1999 |
| JP | 2000-152337 | 5/2000 |
| JP | 2001-217866 | 8/2001 |
| JP | 2001-308932 | 11/2001 |
| JP | 2002-500475 | 1/2002 |
| WO | WO-97/45982 | 12/1997 |
| WO | WO-99/34590 | 7/1999 |
| WO | WO-99/52246 | 10/1999 |
| WO | WO-00/01117 | 1/2000 |
| WO | 0014919 A2 | 3/2000 |
| WO | 0119080 A2 | 3/2001 |

OTHER PUBLICATIONS

Supplemental Search Report, European Application No. EP03724231, dated Mar. 17, 2006, 4 pages.
Australian Patent Office Examination Report, Singapore Application No. 200405002-7, dated Mar. 12, 2007, 4 pages.
1st Substantive Examination Report, European Application No. 03724231.0, dated Oct. 26, 2006, 6 pages.
2nd Examination Report, European Application No. 03724231.0, dated Aug. 27, 2007, 5 pages.
Summons to Attend Oral Proceedings, European Application No. 03724231.0, dated May 28, 2008, 4 pages.
Communication under Rule 71(3) EPC, European Application No. 03724231.0, dated Dec. 18, 2008, 4 pages.
Notice of the Reason for Refusal, Japanese Application No. 2004-500202, dated Dec. 18, 2007, 3 pages.
Notice of the Reason for Refusal, Japanese Application No. 2004-500202, dated Mar. 24, 2009, 7 pages.
Notice of Allowance, Japanese Application No. 2004-500202, dated Jan. 4, 2010, 1 page.
Austrian Patent Office Search and Examination Report, Singapore Application No. 200609004-7, dated Apr. 27, 2009, 8 pages.
D., Durham, et al., The COPS (Common Open Policy Service) Protocol, Network Working Group, Request for Comments: 2748, Jan. 2000, 39 pages.
K., Chan, et al., COPS Usage for Policy Provisioning (COPS-PR), Network Working Group, Request for Comments: 3084, Mar. 2001, 35 pages.
Murtaza, S. C., et al., Dynamic Authorization, Internet-Draft, draft-chiba-radius-dynamic-authorization-00.txt, Nov. 2000, 7 pages.
Murtaza, S. C., et al., Dynamic Authorization, Internet-Draft, draft-chiba-radius-dynamic-authorization-01.txt, Feb. 2002, 6 pages.
Murtaza, S. C., et al., Dynamic Authorization, Internet-Draft, draft-chiba-radius-dynamic-authorization-02.txt, Apr. 2002, 7 pages.
Murtaza, S. C., et al., Dynamic Authorization, Internet-Draft, draft-chiba-radius-dynamic-authorization-03.txt, Jun. 2002, 7 pages.
Murtaza, S. C., et al., Dynamic Authorization, Internet-Draft, draft-chiba-radius-dynamic-authorization-04.txt, Jun. 2002, 7 pages.

DYNAMIC MODIFICATION OF A SUBSCRIBER CONNECTION

CROSS REFERENCE TO RELATED APPLICATIONS

This application is a continuation of application Ser. No. 13/597,189, filed Aug. 28, 2012, which is a continuation of application Ser. No. 13/162,554, filed Jun. 16, 2011, issued as U.S. Pat. No. 8,255,561, which is a continuation of application Ser. No. 11/980,831, filed Oct. 30, 2007, issued as U.S. Pat. No. 7,987,276, which is a continuation of application Ser. No. 10/176,222, filed Jun. 20, 2002, issued as U.S. Pat. No. 7,290,054, which claims the benefit of U.S. provisional patent application No. 60/375,684 entitled "Dynamic Modification of a Subscriber Connection," filed Apr. 26, 2002, which are each incorporated by reference.

FIELD OF THE INVENTION

The invention relates to the field of communications. More specifically, the invention relates to enabling dynamic modification of a subscriber connection.

BACKGROUND OF THE INVENTION

In the field of communications, the need for high-speed transmission of data including video and audio has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service (both using a POTS line), and cable modem service over a Radio Frequency (RF) cable line.

Additionally, there is an increasing demand by the ISPs to allow for modifications in the connection rates for a given type of service. In particular, the market to provide certain services, including DSL, is very competitive. Accordingly, the low-speed connections are deeply discounted. Additionally, there are less users of the higher-speed connections due to the costs. Therefore, ISPs need an approach to offering variable services, wherein a subscriber can typically pay for low-speed connection service, while occasionally upgrading their connection when a higher bandwidth may be needed and/or advantageous.

Accordingly, this enables the ISPs as well as the users of the ISPs flexibility with regard to bandwidth usage and costs associated therewith. To help illustrate, a given user may want to connect to the Internet at a slower connection speed when the user is only traversing pages of different web sites, in comparison to when the user may be involved in a video conference and/or downloading a large amount of data wherein a higher connection speed is needed and/or more advantageous.

Disadvantageously, current approaches to allow for modifications to a subscriber connection (such as modifications to the connection rate or policing values for the connection) to a network require that the subscriber connection be broken, wherein a new connection is re-established that applies these modifications. Accordingly, subscribers experience service interruptions when a modification is made to the current connection. Moreover, administrators working for the ISPs can be required to manage the updates to these subscriber accounts and/or connections.

SUMMARY OF THE INVENTION

A method and apparatus for enabling dynamic modification of a subscriber connection are described. In one embodiment, a method comprises receiving a request to modify a subscriber connection to a network element. The method also includes modifying attributes of the subscriber connection, within a memory of the network element, without disconnecting the subscriber connection from the network element.

In an embodiment, an apparatus comprises a memory to store an attribute of a subscriber connection between a computing device and a network. The apparatus also comprises a forwarding engine coupled to the memory. The forwarding engine is to modify the attribute of the subscriber connection, while the subscriber connection is active, without disconnecting the subscriber connection.

In one embodiment, a network element comprises a traffic card coupled to connect a computing device and a network through a subscriber connection. The network element also comprises a forwarding card coupled to the traffic card. The forwarding card is to store a number of attributes for the subscriber connection. The forwarding card is to include a forwarding engine. The forwarding engine is to modify one of the number of attributes for the subscriber connection, while the subscriber connection is active, without disconnecting the subscriber connection between the computing device and the network.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings.

DETAILED DESCRIPTION

A method and apparatus for enabling dynamic modification of a subscriber connection are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1A:
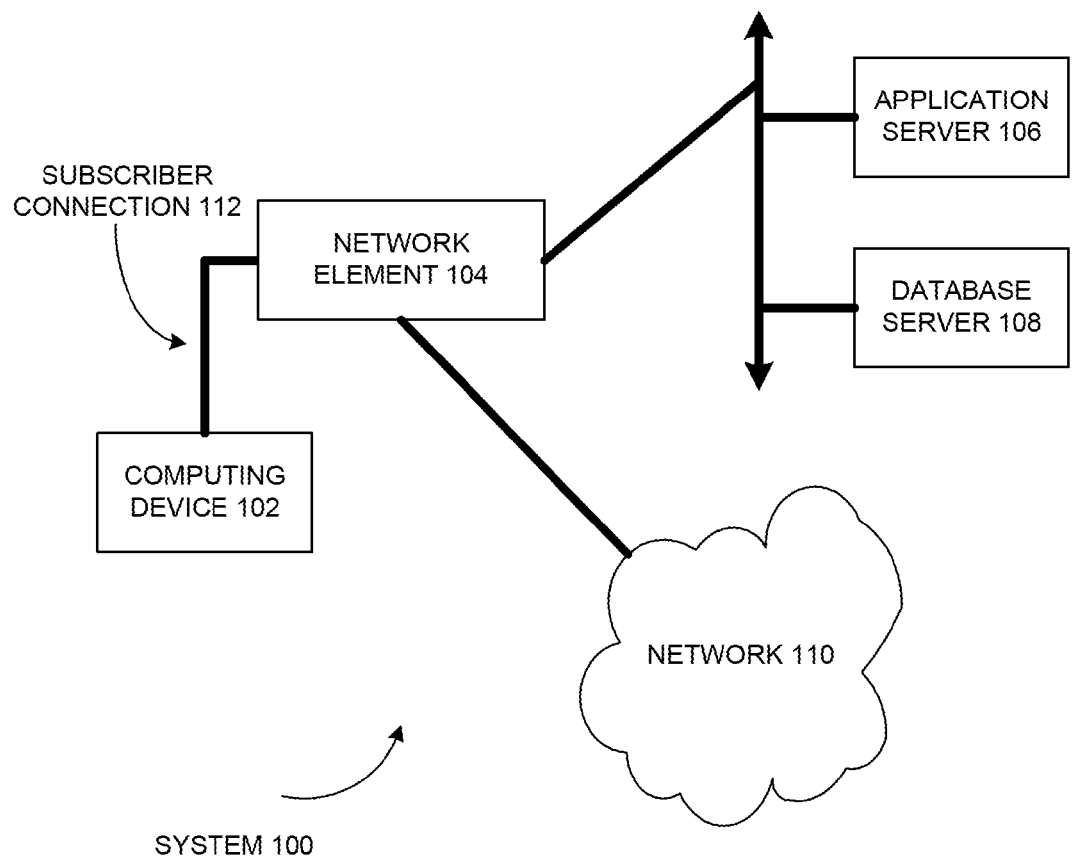
FIGS. 1A-1C illustrate systems for enabling dynamic modification of a subscriber connection, according to one embodiment of the invention.
Figure 1B:
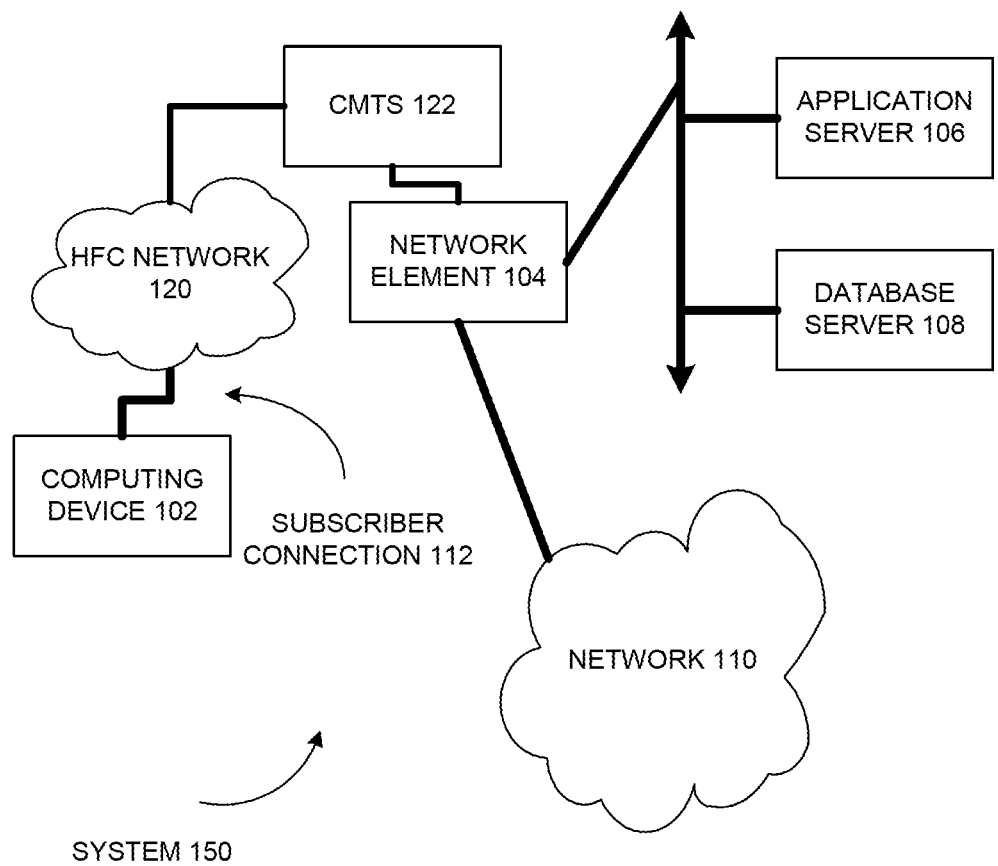
Figure 1C:
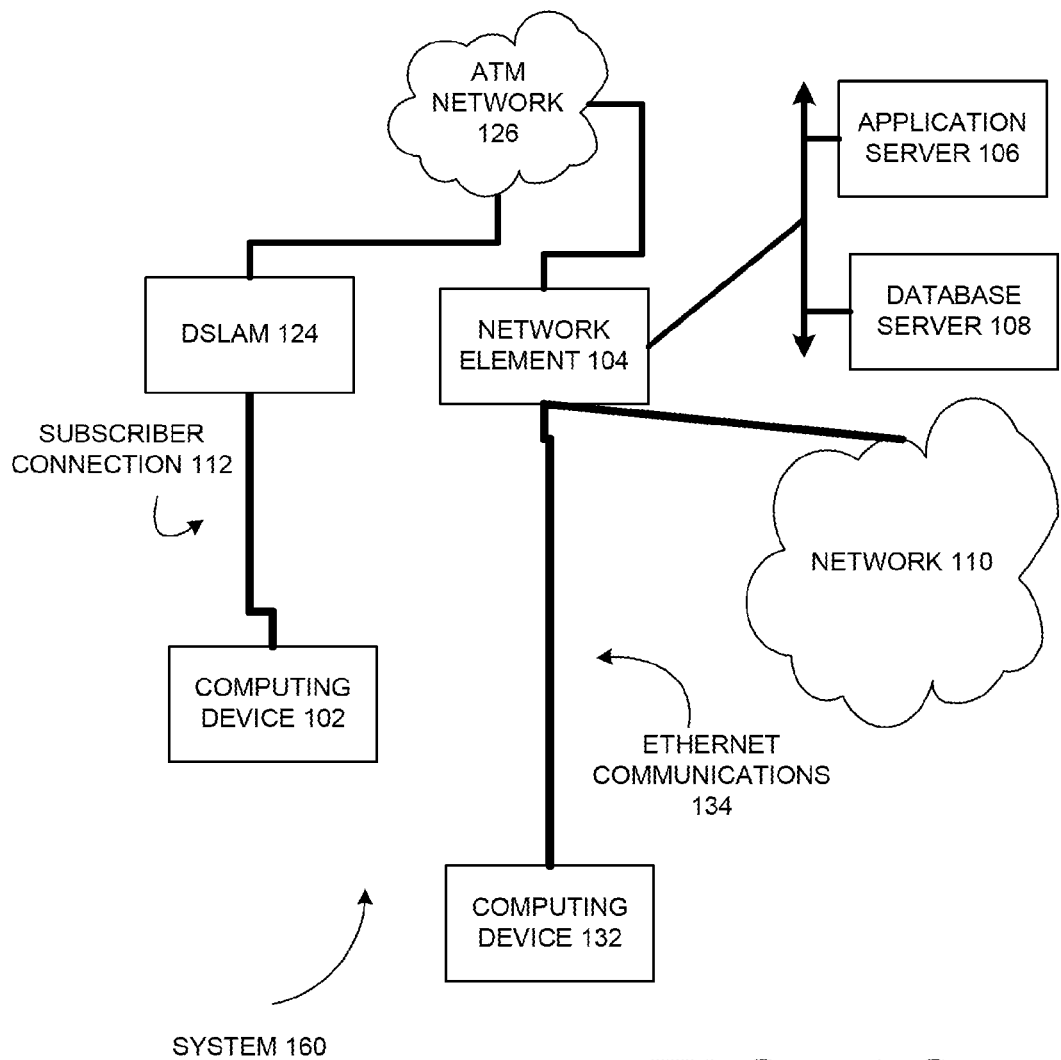
Figure 2:
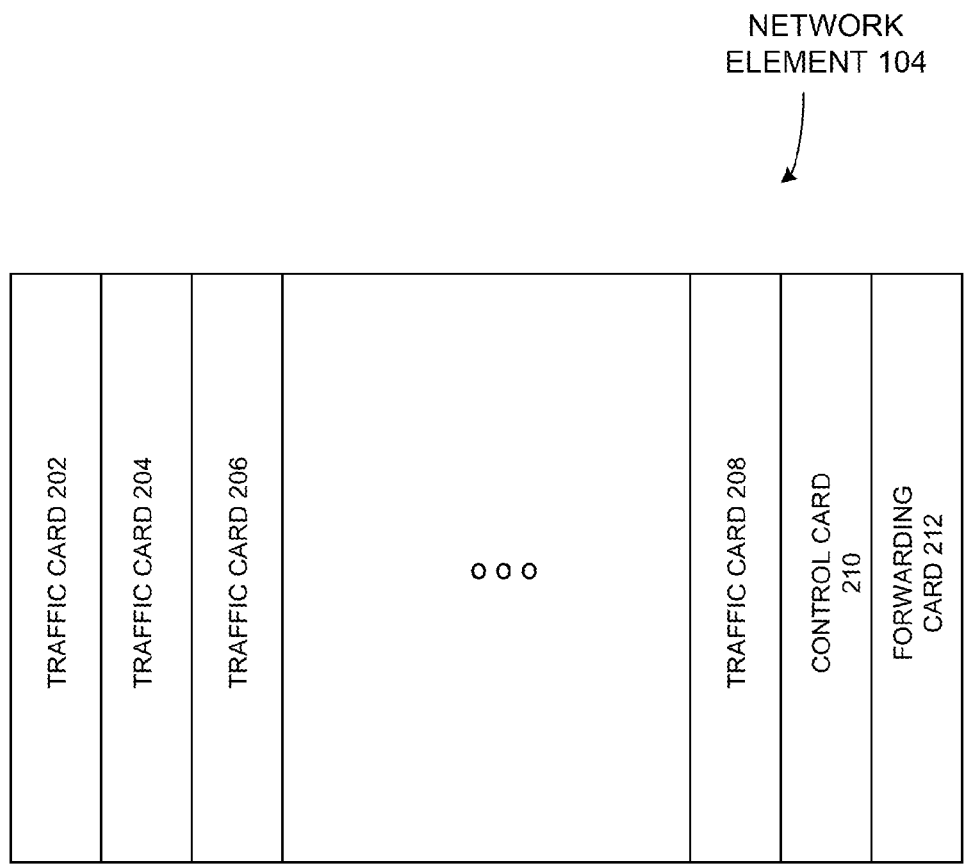
FIG. 2 illustrates a block diagram of a network element, according to an embodiment of the invention.
Figure 3:
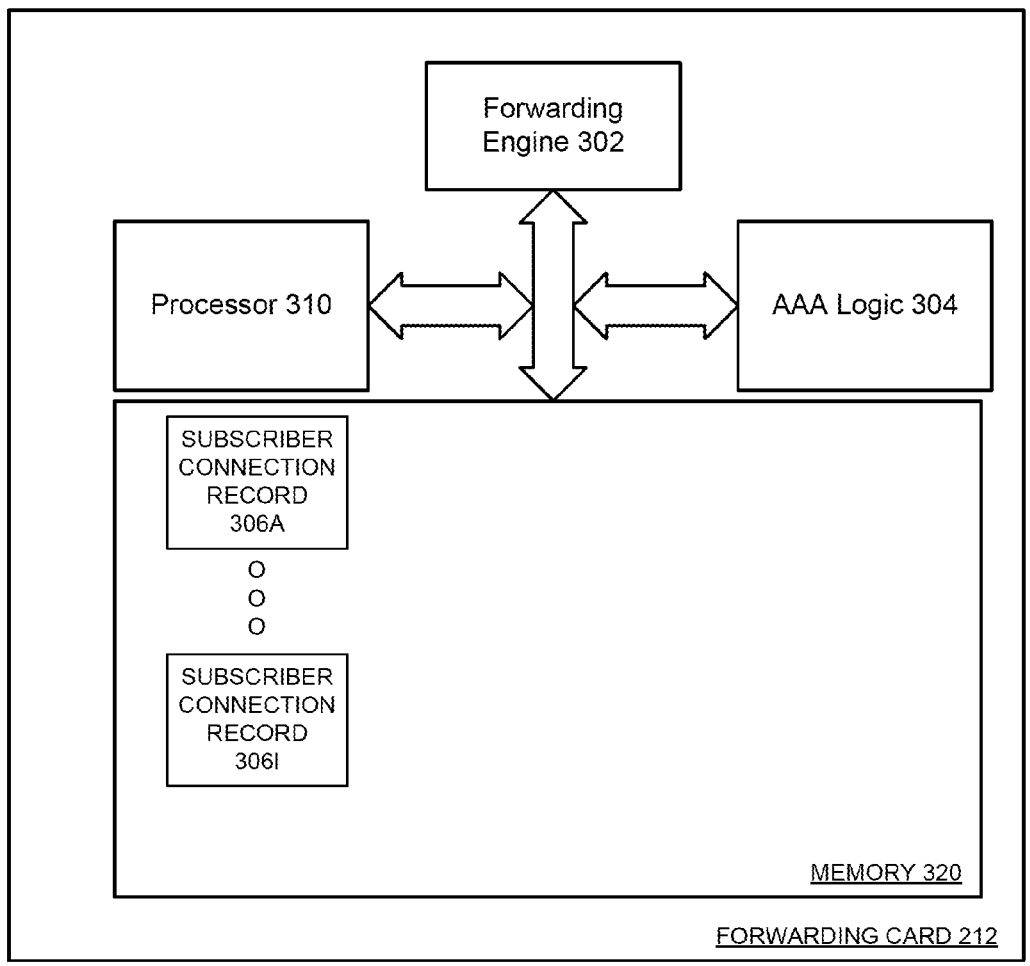
FIG. 3 illustrates a more detailed block diagram of a forwarding card within a network element, according to one embodiment of the invention.
Figure 4:
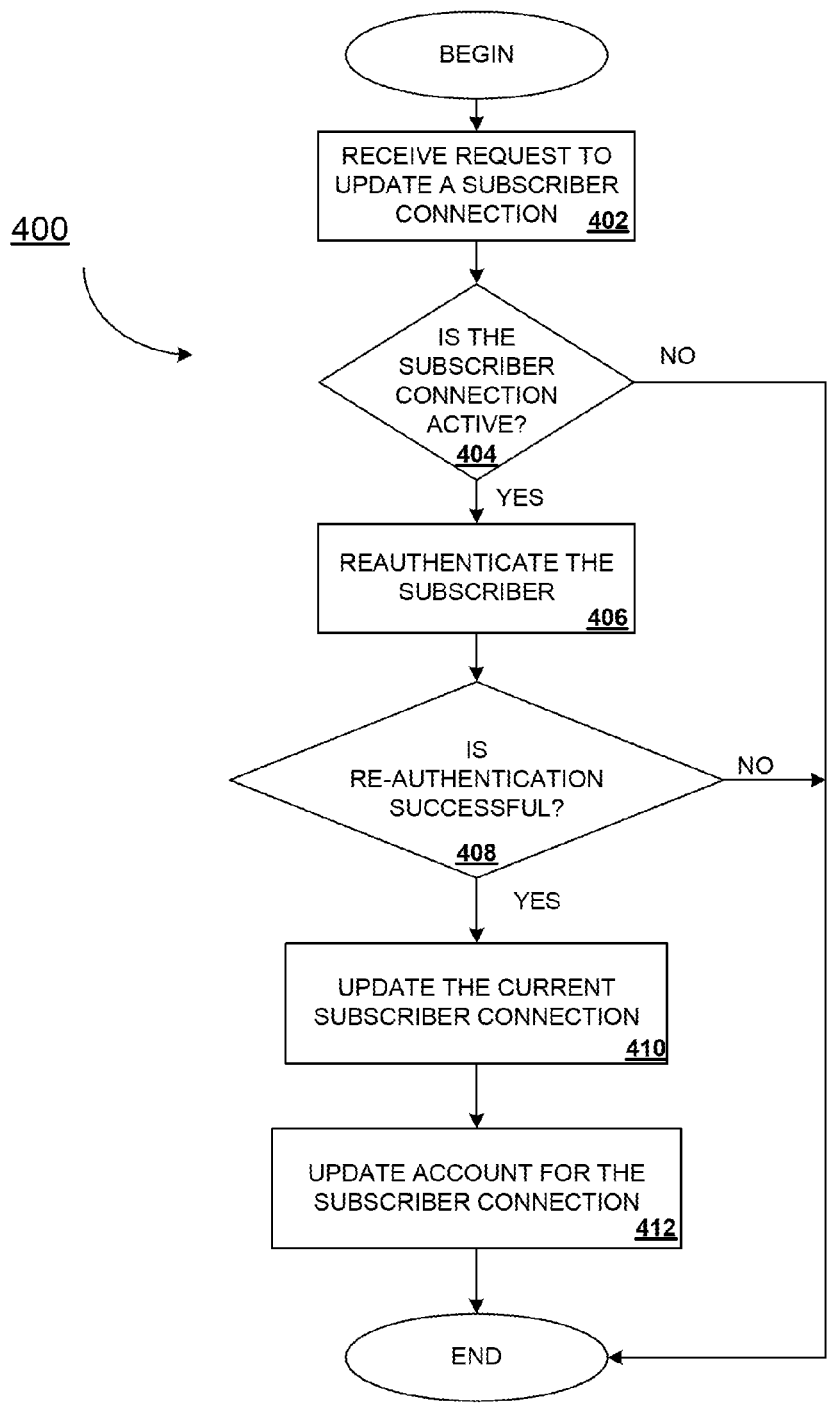
FIG. 4 is a flow diagram for dynamically modifying a subscriber connection, according to one embodiment of the invention.

FIGS. 1-3 show block diagrams of systems for enabling dynamic modification of a subscriber connection, in accordance with embodiments of the invention. FIG. 4 shows a flow diagram illustrating operations for enabling dynamic modification of a subscriber connection, according to embodiments of the invention. The operations of the flow diagram will be described with references to the systems shown in the block diagrams. However, it should be understood that the operations of the flow diagram could be performed by embodiments of systems other than those discussed with reference to the block diagrams, and embodiments discussed with reference to the systems could perform operations different than those discussed with reference to the flow diagram.

FIGS. 1A-1C illustrate systems for enabling dynamic modification of a subscriber connection, according to one embodiment of the invention. As will be described in more detail below, a system 100 of FIG. 1A illustrates a system of communications that can be based on a number of protocols and configurations, while a system 150 of FIG. 1B and a system 160 of FIG. 1C illustrate systems of communications based on specific types of protocols and configurations. In particular, the system 150 of FIG. 1B illustrates a system of communications based on a cable infrastructure, while the system 160 of FIG. 1C illustrates a system of communications based on an infrastructure that employs DSL/Asynchronous Transfer Mode (ATM) and Ethernet. These systems are by way of example and not by way of limitation, as other systems based on other types of protocols and having other types of configurations can incorporate embodiments of the invention. For example, embodiments of the inventions can be incorporated into a wireless infrastructure, wherein wireless concentrators can route data from client devices into the network elements described herein.

With regard to FIG. 1A, a system 100 comprises a computing device 102, a network element 104, a database server 108 and a network 110. As shown, the computing device 102 is coupled to the network element 104 through a subscriber connection 112. The network element 104 is also coupled to the database server 108 and the network 110. In an embodiment, the network element 104 is coupled to the database server 108 through the network 110.

In one embodiment, the network 110 is a local area network (LAN). In an embodiment, the network 110 is a wide area network (WAN). Further, the network 110 may be a combination of different networks that couple the network element 104 to other computing devices and network elements coupled thereto.

In one embodiment, the database server 108 stores data for a number of subscribers and their associated subscriber connections. In an embodiment, the database server 108 stores data related to authentication, authorization and accounting for subscribers coupled to different network elements within a network. In one embodiment, the database server 108 is a RADIUS server for storing this data regarding subscribers and the associated subscriber connections. In one embodiment, the network element 104 enables dynamic modification of a subscriber connection, as will be described in more detail below.

FIG. 1B illustrates a system 150 for routing data in an infrastructure for a cable environment. Similar to the system 100, the system 150 comprises the computing device 102, the network element 104, the database server 108 and the network 110. The system 150 also comprises a hybrid fiber coaxial cable (HFC) network 120 and a cable modem transmission system (CMTS) 122. As shown, the HFC network 120 is coupled to the computing device 102 and the CMTS 122. Additionally, the CMTS 122 is coupled to the network element 104. Accordingly, communications between the computing device 102 and the network element 104 are routed through the HFC network 120 and the CMTS 122.

In an embodiment, the HFC network 120 is a cable infrastructure that combines the radio frequency (RF) data communications of a number of computing devices 102 that are forwarded to the CMTS 122. In an embodiment, the CMTS converts the RF data communications into data packets, such as Internet Protocol (IP) packets, to be routed by the network element 104.

FIG. 1C illustrates a system 160 for routing data in an infrastructure for a DSL and Ethernet environment. Similar to the system 100, the system 160 comprises the computing device 102, the network element 104, the database server 108 and the network 110. The system 160 also comprises a Digital Subscriber Line Access Multiplexer (DLSAM) 124, an Asynchronous Transfer Mode (ATM) network 126 and a computing device 132.

As shown, the computing device 102 is coupled to the network 104 (via the subscriber connection 112) through the DSLAM 124 and the ATM network 126. The computing device 132 is coupled to the network element 104 through an Ethernet communications 134.

As is known in the art, the DSLAM 124 is a device within a network that combines a number of DSL communications into a single ATM transmission. The ATM network 126 comprises a number of communication links for routing data based on the ATM protocol. Accordingly, in an embodiment, the communications from the computing device 102 is received into the network element 104 as data based on the ATM protocol. Additionally, as shown, the computing device 132 and the network element 104 communicate based on the Ethernet protocol through Ethernet communications link 134. The operations of the systems illustrated in FIGS. 1A-1C will be described in more detail below.

FIG. 2 illustrates a block diagram of a network element, according to an embodiment of the invention. In particular, FIG. 2 illustrates a more detailed block diagram of the network element 104. As shown, the network element 104 includes traffic cards 202-208. The network element 104 is not limited to the number of traffic cards shown in FIG. 2, as the network element 104 can include any of a number of different traffic cards. The network element 104 also includes a control card 210 and a forwarding card 212.

In an embodiment, each of the traffic cards 202-208 and the control card 210 can include a processor and memory. The traffic cards 202-208, the control card 210 and the forwarding card 212 are coupled to system buses. In an embodiment, the control card 210 performs control, system configuration and management tasks for the network element 104. For example, if the forwarding card 212 needs to be updated with a new Internet Protocol (IP) address table, such data is received by the control card 210 and transmitted to the forwarding card 212, wherein such data is updated therein. Additionally, as will be described in more detail below, the forwarding card 212 includes memory that stores subscriber connections for the network element 104. For example, returning to FIGS. 1A-1C, when the computing device 102 is coupled to the network element 104, there is a subscriber connection between the computing device 102 and the network element 104 that includes a number of attributes, including data rates (e.g., rate-limit and policing values), access control lists, etc. In one embodiment, the forwarding card 212 updates attributes of these subscriber connections, without disconnecting the subscriber connection between the computing device 102 and the network element 104.

Moreover, the forwarding card 212 provides for buffering, packet processing and forwarding of data packets being received by the traffic cards 202-208. In particular, the traffic cards 202-208 can be coupled to a number of data transmission lines, which are coupled to other network elements and/or computing devices, as shown in FIG. 1. Accordingly, the traffic cards 202-208 receive and transmit data traffic from and to data transmission lines coupled thereto. Such data traffic is transmitted to the forwarding card 212, where this traffic can be buffered, processed and/or forwarded to other traffic cards within the network element 104, as will be described in more detail below.

The embodiment of the network element 104 is by way of example and not by way of limitation, as network elements having other architectural configurations can incorporate embodiments of the present invention. Examples of other network elements that include incorporate embodiments of the present invention could have multiple forwarding cards or have a single line card incorporating the functionality of both the forwarding and the controlling. Moreover, a network element having the forwarding functionality distributed across the traffic cards could incorporate embodiments of the present invention.

FIG. 3 illustrates a more detailed block diagram of a forwarding card within a network element, according to one embodiment of the invention. In particular, FIG. 3 illustrates a more detailed block diagram of the forwarding card 212. As shown, the forwarding card 212 comprises a processor 310, a memory 320, a forwarding engine 302 and an authentication/authorization/accounting (AAA) logic 304.

The processor 310 is coupled to the forwarding engine 302, the AAA logic 304 and the memory 320. The forwarding engine 302 is coupled to the AAA logic 304 and the memory 320. The AAA logic 304 is coupled to the memory 320.

The processor 310 may comprise any suitable processor architecture. The forwarding card 212 for other embodiments may comprise more processors any of which may execute a set of instructions that are in accordance with embodiments of the present invention. The memory 320 stores a number of subscriber connection records 306A-I. These subscriber connection records 306 include a number of attributes associated with the subscriber connection, including the source address (e.g., the source Internet Protocol (IP) address), the rate limit value, the policing value, the access control list, etc. The memory 320 may store also store other data and/or instructions, for example, for the forwarding card 212 and may comprise any suitable memory, such as a dynamic random access memory (DRAM) for example.

In an embodiment, the forwarding engine 302 and the AAA logic 304 are processes or tasks that can reside within the memory 320 and/or the processor 310 and can be executed within the processor 310. However, embodiments of the present invention are not so limited, as the forwarding engine 302 and the AAA logic 304 can be different types of hardware (such as digital logic) executing the processing described therein (which is described in more detail below).

Accordingly, the forwarding card 212 may include a machine-readable medium on which is stored a set of instructions (i.e., software) embodying any one, or all, of the methodologies described herein. For example, software can reside, completely or at least partially, within the memory 320 and/or within the processor 310.

The operations of dynamically modifying a subscriber connection will now be described. In particular, FIG. 4 is a flow diagram for dynamically modifying a subscriber connection, according to one embodiment of the invention. The operation of flow diagram 400 will be described with reference to the exemplary systems shown FIGS. 1-3.

In block 402, a request to update a subscriber connection is received. With reference to the exemplary embodiment of FIG. 3, the forwarding engine 302 receives this request. In one embodiment, the database server 108 transmits this request to the forwarding engine 302. In an embodiment, the application server 106 receives this request from the subscriber and forwards this request to the database server 108. As described above, the database server 108 can store records for the different subscriber connections for a number of network elements (including the network element 104). Accordingly, logic within the database server 108 updates the attributes of this subscriber connection and forwards the request to the network element 104. In an embodiment, the database server 108 transmits this request to the forwarding engine 302 using the Simple Network Management Protocol (SNMP). In another embodiment, the database server 108 transmits this request to the forwarding engine 302 using a command line interface (CLI).

To help illustrate, a subscriber, such as a user of the computing device 102, could be connected to the network element 104 through the subscriber connection 112. Such a subscriber may want to modify the attributes, such as the current data rate, of the subscriber connection. Accordingly, the subscriber could transmit this request to update the current subscriber connection to the application server 106. For example, in one embodiment, the subscriber could communicate this request using a web page of a web site that is within the application server 106. Such a web page may enable modifications to the current subscriber connection.

In one embodiment, the subscriber could manually generate this request. In other embodiments, this request could be dictated by the user of the computing device 102. For example, a first user could be an adult wherein the attributes, such as the access control list, is different when compared to a second user, who is a child. Accordingly, when the first user logs off and the second user logs on, such that the subscriber connection remains active, a script could be generate this request to modify the attributes for this subscriber connection.

However, embodiments of the invention are not limited to the use of a web interface and/or the application server 106 for the communication of this request. For example, in another embodiment, the subscriber could communicate this request directly to the network element 104 without the use of the application server 106. Moreover, requests for updates to the subscriber connection are not limited to those request generated by a subscriber. For example, in other embodiments, a current ISP allowing for the subscriber connection may make periodic adjustments to different subscriber connections. In another embodiment, the control card 210 within the network element 104 may generate such a request to allow, for example, for bandwidth balancing across of a number of subscribers, etc.

In block 404, a determination is made on whether the subscriber connection is still active. With reference to the exemplary embodiment of FIG. 3, the forwarding engine 302 makes this determination. In one embodiment, the forwarding engine 302 performs a lookup into the memory 320 to retrieve the associated subscriber connection record 306. In one embodiment, the request for modifications includes the source address for the subscriber. Accordingly, in an embodiment, the forwarding engine 302 retrieves the associated subscriber connection record 306 based on this address. In an embodiment, this is the source IP address for the subscriber. However, embodiments of the invention are so limited, as any other type of identification of the subscriber connection can be employed. For example, in an embodiment, the identification of the subscriber can be the Ethernet address for the network card within the computing device 102.

In an embodiment, if the associated subscriber connection record 306 is located within the memory 320, the subscriber connection is considered active. In another embodiment, the subscriber connection record 306 includes a field that indicates whether the associated subscriber connection is active. Accordingly, subscriber connection records 306 may reside in the memory 320 even when the subscriber connection is no longer active.

Upon determining that the subscriber connection is not active, the operations of the flow diagram 400 are complete. As described above, in an embodiment, the attributes for the subscriber connection that were requested to be updated were updated within the database server 108. Therefore, when the subscriber establishes a new subscriber connection these attributes will be incorporated into this new subscriber connection.

In block 406, upon determining that the subscriber connection is active, the subscriber is re-authenticated. With reference to the exemplary embodiment illustrated in FIG. 3, the forwarding engine 302 re-authenticates the subscriber. In an embodiment, the forwarding engine 302 forwards a re-authorization request for this subscriber to the AAA logic 304.

In one embodiment, the AAA logic 304 generates a re-authenticate request for this subscriber that is forwarded to the database server 108.

In block 408, a determination is made on whether the re-authentication is successful. With reference to the exemplary embodiment illustrated in FIG. 3, the forwarding engine 302 makes this determination. In an embodiment, the forwarding engine 302 determines that this re-authentication of the subscriber is successful based on receipt of the attributes for this subscriber connection in response to the re-authenticate request back from the database server 108. In an embodiment, the database server 108 transmits all of the attributes for this subscriber connection to the forwarding engine 302. In another embodiment, the database server 108 transmits those attributes of the subscriber connection that need to be updated to the forwarding engine 302. Upon determining that the re-authentication is not successful, the operations of the flow diagram 400 are complete.

In block 410, upon determining that the re-authentication is successful, the current subscriber connection is updated. With reference to the exemplary embodiment illustrated in FIG. 3, the forwarding engine 302 updates the current subscriber connection. In an embodiment, the forwarding engine 302 updates the current subscriber connection without disconnecting the subscriber connection from the network element 104.

In an embodiment, such an update message is stored into a task queue of the forwarding engine 302. In one embodiment, the forwarding engine 302 is a single threaded process. Accordingly, the forwarding engine 302 processes the different tasks stored in the task queue in an order that such tasks are stored therein.

As described above, in an embodiment, the forwarding engine 302 processes the packets received into the network element 104. In one such embodiment, the forwarding engine 302 determines whether to drop data packets for a given subscriber (whether being received from or transmitted to) based on the data rates for this subscriber connection stored in the associated subscriber connection record 306. For example, if a packet is received from a given subscriber connection and the data rate for this subscriber connection is beyond the limits provided in the associated subscriber connection record 306, the forwarding engine 302 drops the packet. Conversely, if a packet is received from a given subscriber connection and the data rate for this subscriber connection is within the limits provided in the associated subscriber connection record 306, the forwarding engine 302 forwards the packet based on the destination address stored in the packet.

As described, in an embodiment, the forwarding engine 302 is reading from and writing to the different subscriber connection records 306. Because in an embodiment, the forwarding engine 302 is a single-threaded process, there is no conflict between two different processes attempting to access a given subscriber connection record 306. Therefore, the subscriber connection can be dynamically updated within the memory 320 of the network element 104 without having to disconnect or tear down the subscriber connection to allow for the updates to the subscriber connection to take effect.

In an embodiment, because the forwarding engine 302 is both forwarding packets as well as updating the different subscriber connection records 306, the forwarding engine 302 can employ a same task queue for processing both types of tasks, such that the forwarding engine 302 processes the different types of task as based on the order in which such tasks are stored into task queue. However, embodiments of the invention are not so limited. For example, in another embodiment, one task queue can be associated with the forwarding of packets, while a separate task queue can be associated with the updates to the different subscriber connection records 306. Accordingly, the forwarding engine 302 can employ a number of different types of arbitration when processing the tasks from the different task queues. For example, in an embodiment, the forwarding engine 302 would only process a task from the task queue for updating the different subscriber connection records 306 when the other task queue is empty. In another embodiment, the forwarding engine 302 would process the tasks from the different tasks queues in a N-to-M ratio. For example, in an embodiment, the forwarding engine 302 would process two tasks from the task queue for forwarding packets for every one task processed from the task queue for updating the different subscriber connection records 306.

However, embodiments of the invention are not limited such that the forwarding engine 302 is a single-threaded process. In another embodiment, the forwarding engine 302 can be comprises of a number of different threads. In one such embodiment, in order to preclude access conflicts to the subscriber connection records 306, the threads of the forwarding engine 302 lock the subscriber connection records 306 when accessing such records. For example, an update thread within the forwarding engine 302 may process the update messages received for the different subscriber connection records 306, while a packet forwarding thread may process the data packets received fro the different subscriber connections. As described, the two different threads can attempt to access a same subscriber connection record 306. For example, the update thread may attempt to update a given subscriber connection record 306 to modify the policing value attribute. At a same time, the packet forwarding thread may attempt to read the given subscriber connection record 306 to determine whether to forward or drop the current data packet for this subscriber connection.

Therefore, in an embodiment, the different threads can lock the different subscriber connection records 306 such that a second thread may have to wait for the completion of an access of a given subscriber connection record 306 by a first thread. In other embodiments, multiple copies of the subscriber connection records 306 can be maintained such that different threads access different copies of the subscriber connection records 306 in order to preclude access conflicts. Accordingly, a separate thread can keep the different copies of the subscriber connection records 306 up to date.

In block 412, the account for the subscriber connection is updated. With reference to the exemplary embodiment illustrated in FIG. 3, the forwarding engine 302 updates the account for the subscriber connection. In an embodiment, the forwarding engine 302 generates an accounting message that includes those attributes that have been updated that affect the account for the subscriber. For example, if the attributes updated include the rate limit and/or policing values for the subscriber connection, these new values can affect the cost being charged for this subscriber connection. In one embodiment, the forwarding engine 302 transmits this account message to the database server 108, where account data for this given subscriber connection is updated.

The servers as well as the traffic cards, forwarding cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes machine storage media (read only memory (ROM); random access memory (RAM); magnetic disk storage media; optical storage media; flash memory devices) and machine transmission media (electrical, optical, acoustical or other form of propagated signals (e.g., carrier waves, infrared signals, digital signals, etc.)); etc.

Thus, a method and apparatus for enabling dynamic modification of a subscriber connection have been described. Although the present invention has been described with reference to specific exemplary embodiments, it will be evident that various modifications and changes may be made to these embodiments without departing from the broader spirit and scope of the invention. For example, while embodiments of the invention are described such that a separate database server is coupled to store data related to subscriber connections. In other embodiments, such data can be stored within the network element 104. Accordingly, the specification and drawings are to be regarded in an illustrative rather than a restrictive sense.

What is claimed is:

1. A computer-implemented method comprising:
   storing, in a subscriber record associated with a subscriber at a database server, one or more attributes of an active subscriber connection coupling a computing device associated with the subscriber to a network, wherein the one or more attributes includes at least a data rate attribute for the active subscriber connection;
   receiving, at the database server, a request to modify one or more attributes of the active subscriber connection including at least the data rate attribute for the active subscriber connection;
   modifying, at the database server, at least one of the one or more attributes of the active subscriber connection including modifying at least the data rate attribute for the active subscriber connection; and
   transmitting, by the database server to a network element coupled with the computing device, at least one modified attribute including at least the modified data rate attribute for the active subscriber connection to cause the network element to modify a corresponding attribute without disconnecting the active subscriber connection from the network element.

2. The computer-implemented method of claim 1, wherein the active subscriber connection is connecting the computing device to the network through the network element, and wherein the modified data rate attribute comprises a modification of a rate at which data is received into the computing device from the network.

3. The computer-implemented method of claim 1, wherein the active subscriber connection is connecting the computing device to the network through the network element, and wherein the modified data rate attribute comprises a modification of a rate at which data is transmitted from the computing device to the network.

4. The computer-implemented method of claim 1, further comprising:
   wherein modifying the at least one of the one or more attributes of the active subscriber connection further comprises modifying an access control list of the active subscriber connection; and
   transmitting, by the database server to the network element, at least the modified access control list.

5. The computer-implemented method of claim 1, further comprising updating, by the database server, an account for the active subscriber connection upon modifying the at least one of the one or more attributes of the active subscriber connection.

6. The computer-implemented method of claim 1, wherein the database server is a RADIUS server.

7. The computer-implemented method of claim 1, wherein the request is received from an application server that allows the subscriber to modify the active subscriber connection.

8. A non-transitory machine-readable medium of a database server that provides instructions, that when executed by a processor of the database server, cause said processor to perform operations comprising:
- storing, in a subscriber record associated with a subscriber, one or more attributes of an active subscriber connection coupling a computing device associated with the subscriber to a network, wherein the one or more attributes includes at least a data rate attribute for the active subscriber connection;
- receiving a request to modify one or more attributes of the active subscriber connection including at least the data rate attribute for the active subscriber connection;
- modifying at least one of the one or more attributes of the active subscriber connection including modifying at least the data rate attribute for the active subscriber connection; and
- transmitting, to a network element coupled with the computing device, at least one modified attribute including at least the modified data rate attribute for the active subscriber connection to cause the network element to modify a corresponding attribute without disconnecting the active subscriber connection from the network element.

9. The non-transitory machine-readable medium of claim 8, wherein the active subscriber connection is connecting the computing device to the network through the network element, and wherein the modified data rate attribute comprises a modification of a rate at which data is received into the computing device from the network.

10. The non-transitory machine-readable medium of claim 8, wherein the active subscriber connection is connecting the computing device to the network through the network element, and wherein the modified data rate attribute comprises a modification of a rate at which data is transmitted from the computing device to the network.

11. The non-transitory machine-readable medium of claim 8, further comprising:
- wherein modifying the at least one of the one or more attributes of the active subscriber connection further comprises modifying an access control list of the active subscriber connection; and
- wherein the non-transitory machine-readable medium further provides instructions that, when executed by the processor, cause said processor to perform operations including transmitting, to the network element, at least the modified access control list.

12. The non-transitory machine-readable medium of claim 8, wherein the non-transitory machine-readable medium further provides instructions that, when executed by the processor, cause said processor to perform operations including updating an account for the active subscriber connection upon modifying the at least one of the one or more attributes of the active subscriber connection.

13. The non-transitory machine-readable medium of claim 8, wherein the database server is a RADIUS server.

14. The non-transitory machine-readable medium of claim 8, wherein the request is received from an application server that allows the subscriber to modify the active subscriber connection.

15. A database server, comprising:
a processor; and
a non-transitory machine-readable medium containing instructions executable by said processor whereby said database server is operative to:
- store, in a subscriber record associated with a subscriber, one or more attributes of an active subscriber connection coupling a computing device associated with the subscriber to a network, wherein the one or more attributes includes at least a data rate attribute for the active subscriber connection;
- receive a request to modify one or more attributes of the active subscriber connection including at least the data rate attribute for the active subscriber connection;
- modify at least one of the one or more attributes of the active subscriber connection including modifying at least the data rate attribute for the active subscriber connection;
- transmit, to a network element coupled with the computing device, at least one modified attribute including at least the modified data rate attribute for the active subscriber connection to cause the network element to modify a corresponding attribute without disconnecting the active subscriber connection from the network element.

16. The database server of claim 15, wherein the active subscriber connection is connecting the computing device to the network through the network element, and wherein the modified data rate attribute comprises a modification of a rate at which data is received into the computing device from the network.

17. The database server of claim 15, wherein the active subscriber connection is connecting the computing device to the network through the network element, and wherein the modified data rate attribute comprises a modification of a rate at which data is transmitted from the computing device to the network.

18. The database server of claim 15, further comprising:
- wherein modifying the at least one of the one or more attributes of the active subscriber connection further comprises modifying an access control list of the active subscriber connection; and
- wherein the non-transitory machine-readable medium further contains instructions executable by said processor whereby said apparatus is operative to transmit, to the network element, at least the modified access control list.

19. The database server of claim 15, wherein the non-transitory machine-readable medium further contains instructions executable by said processor whereby said apparatus is operative to update an account for the active subscriber connection upon modifying the at least one of the one or more attributes of the active subscriber connection.

20. The database server of claim 15, wherein the database server is a RADIUS server.

21. The database server of claim 15, wherein the request is to be received from an application server that allows the subscriber to modify the active subscriber connection.

* * * * *

UNITED STATES PATENT AND TRADEMARK OFFICE
CERTIFICATE OF CORRECTION

PATENT NO. : 9,258,336 B2  
APPLICATION NO. : 14/287948  
DATED : February 9, 2016  
INVENTOR(S) : Stoner et al.

It is certified that error appears in the above-identified patent and that said Letters Patent is hereby corrected as shown below:

On the Title Page

Item (72), under "Inventors", in Column 1, Line 2, delete "Hojbjerg" and insert -- Højbjerg --, therefor.

In the Specification

In Column 1, Line 8, delete "2012, which" and insert -- 2012, now Pat. No. 8,738,747, which --, therefor.

In Column 9, Line 16, delete "fro the" and insert -- from the --, therefor.

Signed and Sealed this  
Thirty-first Day of May, 2016

Michelle K. Lee  
*Director of the United States Patent and Trademark Office*